United States Patent [19]

Benit et al.

[11] Patent Number: 4,787,168
[45] Date of Patent: Nov. 29, 1988

[54] FISHING LINE DISPENSER AND DISPLAY PACKAGE

[75] Inventors: Brad J. Benit; Gary B. Ader, both of Spirit Lake, Iowa

[73] Assignee: Berkley, Inc., Spirit Lake, Iowa

[21] Appl. No.: 47,734

[22] Filed: May 7, 1987

[51] Int. Cl.⁴ ............................................. A01K 97/00
[52] U.S. Cl. ...................... 43/25.2; 43/54.1; 242/84.1 R
[58] Field of Search .............. 43/25, 54.1, 25.2; 242/84.1 R, 129.5, 132, 137.1, 138, 146; 206/389, 407, 409; 16/340, 342

[56] References Cited

U.S. PATENT DOCUMENTS

| | | | |
|---|---|---|---|
| D. 273,410 | 4/1984 | Tomosy | D22/99 |
| 1,433,356 | 10/1922 | Edwards | 242/146 X |
| 1,509,031 | 9/1924 | Sandstrom | 16/342 |
| 1,850,074 | 3/1932 | Crandall | 43/54.1 X |
| 2,639,869 | 5/1953 | Levine | 43/25 X |
| 3,261,569 | 7/1966 | Bedell | 242/146 X |
| 3,298,127 | 1/1967 | Bedell | 43/25.2 |
| 3,402,501 | 9/1968 | Davis | 43/54.1 X |
| 3,765,618 | 10/1973 | Johnson et al. | 242/84.1 R |
| 3,957,224 | 5/1976 | Smith | 43/25 X |
| 3,962,815 | 6/1976 | Christensen | 43/54.5 R |
| 4,141,479 | 2/1979 | Dennison | 242/137.1 X |
| 4,290,223 | 9/1981 | Ostenberg et al. | 43/54.5 R |
| 4,354,323 | 10/1982 | Huff | 43/54.5 A X |
| 4,486,971 | 12/1984 | Miller | 43/57.3 |
| 4,505,952 | 3/1985 | Chambley | 43/44.98 X |
| 4,574,423 | 3/1986 | Ito et al. | 16/342 |
| 4,583,315 | 4/1986 | Schreck | 43/54.1 |

FOREIGN PATENT DOCUMENTS 485006  2/1952  Canada ........................ 43/25

Primary Examiner—Nicholas P. Godici
Assistant Examiner—Carmine Cuda
Attorney, Agent, or Firm—Faegre & Benson

[57] ABSTRACT

A fishing line dispenser and display package 10 having a cover 12 and a container section 14 that rotatably engage and support a spool of fishing line 26. The spool 26 rotates around a spindle 54 formed in the dispenser 10. Internal threads 40, formed on the inner circumference of the lip ring 16 provide threadable engagement of cover 12 to the external threads 38 carried by a mouth ring 36 of container 14. A fluid tight seal is provided between cover 12 and container 14 when line is not being dispensed. The fishing line 24 is dispensed through a fishing line feed aperture 22. Also contained within dispenser 10 is a resilient pad 34 for engaging a side wall 48 of the spool 26 and housing 10 thereby providing drag to the fishing line 24 being dispensed. The fishing line adjustable dispenser 10 also has projecting from its housing a bracket with a pair of shaft engaging hooks 20 formed in it, for attachment of the dispenser 10 to a shaft of a fishing rod 58 for ease in dispensing fishing line onto a rod-mounted reel.

13 Claims, 1 Drawing Sheet

U.S. Patent    Nov. 29, 1988    4,787,168
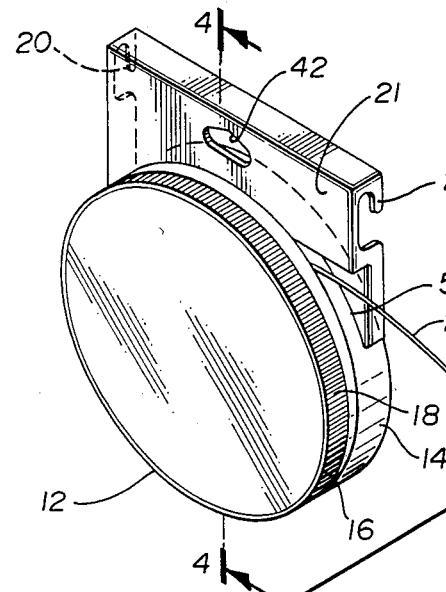
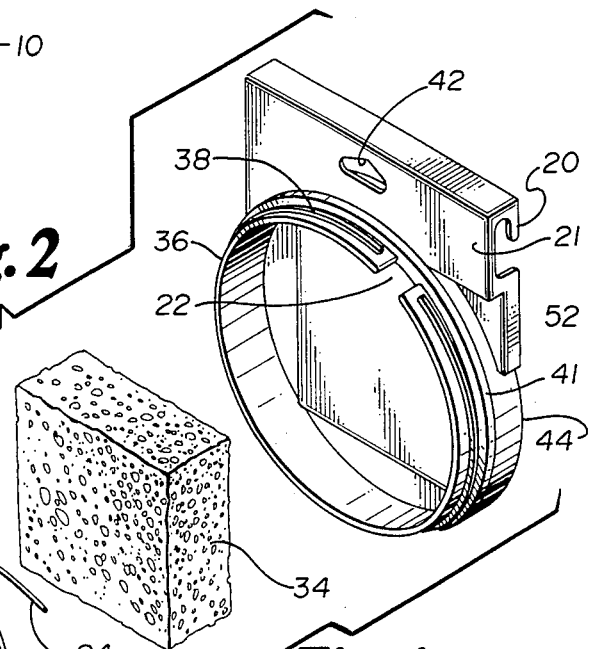
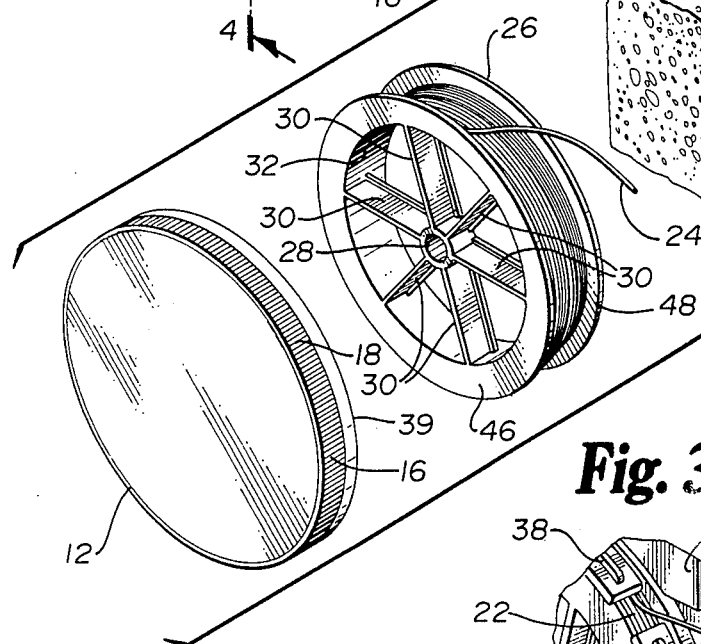
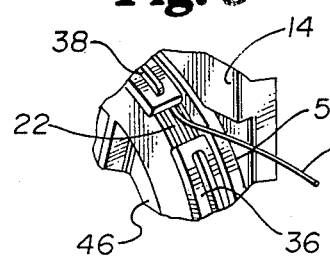
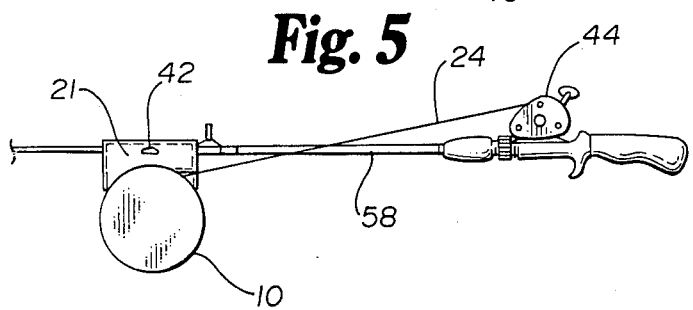
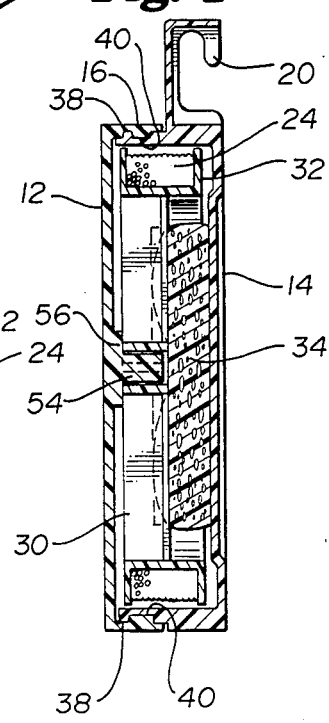

FISHING LINE DISPENSER AND DISPLAY PACKAGE

BACKGROUND OF THE INVENTION

1. Field of the Invention

The present invention is related generally to the field of fishing apparatus. It is specifically directed to fishing line dispensers and to display packages for fishing line.

2. Description of the Prior Art

It is well known in the prior art to transfer fishing line onto fishing reels from supply spools. A problem with dispensing fishing line from spools has been the inherent awkwardness one person has in accomplishing this task. In the prior art the feeding of the fishing line evenly onto a fishing reel may require two people; one person to hold the rod and rotate the reel and a second person to hold and monitor the spool of fishing line. This is a time consuming task at best. One prior art patent, U.S. Pat. No. 3,957,224 (Smith), provides means for hanging a fishing line dispenser on the fishing rod to dispense line directly onto the reel. The Smith patent uses a flexible webbing to support a pin about which the spool of line rotates. However, the Smith patent has no means for applying friction or drag to the line being dispensed. Therefore, improper tension and tangling of the line being dispensed is still a problem with this prior art.

In U.S. Pat. No. 4,141,479 (Dennison), frictional engagement between the spool and the post about which the spool rotates provides drag to the line being dispensed, but the extent of the applied drag is not adjustable.

Other means of providing friction or drag to the line dispensed is illustrated in U.S. Pat. No. 4,290,223 (Ostenberg). In Ostenberg, a pair of resilient pads are mounted within the container in an opposing posture and are mutually self-biased into engagement. Here the line is threaded from the spool through the mutually opposed resilient pads and away from the container erasing the coil memory of the length of line as it is dispensed.

Problems have been encountered with the above-referenced patents in that although drag may be applied to the line dispensed, in Dennison, use of the apparatus wears away the means of frictional engagement by the post of the spool and in Ostenberg, spool overrun, snailing or back-lashing of the fishing line can still occur during operation. Ostenberg applies friction to the line but not to the spool which remains freely rotatable.

U.S. Pat. No. 4,583,315 (Schreck) provides for the resting together of different sized spools with screw means for holding the multiple spools in a non-rotating manner within the container. The line is pulled out between the peripheries of the reels and are held frictionally by reel skirts.

Apparatus providing for quick and easy loading of fishing line onto a fishing reel without snarling or otherwise entangling the line would be a marked improvement, as well as providing an economical means for packaging spooled line for retail sales.

SUMMARY OF THE INVENTION

The present invention is a fishing line dispenser for facilitating the loading of fishing line, while under controlled tension onto a reel mounted on a fishing rod. It includes a housing that rotatably supports a spool of fishing line. Additionally, it is an object of this invention to provide means to temporarily secure the housing to a fishing rod during the line dispensing operation.

The invention of this application is, thus, an improved fishing line dispenser for use with fishing rods and reels of various construction. More specific advantages will become apparent with reference to the detailed description of the invention, claims, and appended drawings.

BRIEF DESCRIPTION OF THE DRAWINGS

FIG. 1 is a view in perspective of a fishing line dispenser in accordance with the present invention;

FIG. 2 is an exploded perspective view of the apparatus illustrated in FIG. 1 with the various elements shown;

FIG. 3 is a fragmentary perspective view of the apparatus illustrated at FIG. 1 with the fishing line feed aperture shown;

FIG. 4 is an elevational view of a vertical cross section taken along line 4—4 of FIG. 1; and FIG. 5 is a side elevational view in reduced scale of the invention in its position of use on a shaft of a fishing rod.

DETAILED DESCRIPTION OF THE PREFERRED EMBODIMENT

Referring to the drawings, wherein like numerals represent like parts throughout the several views, there is generally disclosed in FIG. 1 a fishing line dispenser 10. The dispenser 10 has two threadably engagable housing portions which unite to form a closed container: a cover 12 and a container 14, also illustrated at FIGS. 2 and 4. Cover 12 includes a lip ring 16 having a fluted band 18 formed on the outer circumference thereof for ease in manually gripping the cover 12. Internal threads 40, formed on the inner circumference of the lip ring 16 and illustrated at FIG. 4, provide threaded engagement of cover 12 to the external threads 38, also illustrated at FIG. 2, carried by a mouth ring 36 of container 14. A seal is formed between cover 12 and container 14 by the engagement of the lip 39 of cover 12 against the interfitting shoulder 41 around the circumference of container 14 below threads 38.

Dispenser 10, shown in FIGS. 1, 2 and 4, includes means for attaching it to a shaft of a fishing rod 58. These attachment means consist of a pair of integral shaft engaging hooks 20, the second hidden from view but shown in broken lines in FIG. 1, formed in a hangar bracket 21 attached to side wall of container 14. Also included in this back housing portion 14 is a gap 22 in the container wall which serves as a fishing line feed aperture and is illustrated in FIGS. 2 and 3. Aperture 22 is positioned for enabling the fishing line 24 to travel in a straight line from a supply spool spool 26 to reel 44, as illustrated generally at FIG. 5. A hook receiving hole 42 in bracket 21 provides means for hanging the dispenser, 10 from a display hook, not shown. The dispenser is a useful display package which, because of its relatively simple construction and modest cost can be provided to a customer with each spool of line sold. The seal between the cover 12 and container 14 preserves the freshness of the line 24 while it is being displayed for sale and after less than an entire spool has been dispensed.

FIG. 2 illustrates the element fishing line dispenser 10 of FIG. 1 in exploded form. The elements and their orientation within dispenser 10 housing, are shown. Fishing line 24 is wound on spool 26, and face of spool 26 is engaged by a resilient pad 34. It is the addition of the resilient pad 34 to the dispenser 10 that provides drag to fishing line 24 as it is drawn from dispenser 10. The drag or tension force is varied by partially opening or closing dispenser 10 by loosening or tightening cover 12 on container 14 to grip pad 34 with the desired force to produce a drag appropriate to the specific line being dispensed.

In the preferred embodiment shown, the fishing line spool 26 is shown as including a central hub 28. Radiating from central hub 28 are a series of spokes 30 which attach to the spool rim 32. Flanking the spool rim 32 are two side walls 46, 48 of the spool 26 which help maintain the fishing line on the spool. The exact structure of spool 26 is not critical. In the embodiment shown spokes 30 of spool 26 are normally forced into the surface of pad 34 so that spool 26 and pad 34 rotate as a unit restrained by the frictional drag of the other face of pad 34 against an inside wall of dispenser 10.

FIG. 3 is a fragmentary perspective view of the fishing line dispenser 10. Illustrated in this fragmentary view is a left side wall 46 of the fishing line spool 26 with again a fragment of one of the spokes 30 formed in the spool 26. A right side wall 48 of the spool is illustrated in FIG. 2. The fishing line 24 exits the dispenser 10 at the fishing line feed aperture 22.

Hangar bracket 21 forms a part of the housing back 14. Bracket 21 has a breakaway feature which, when the bracket is separated from the housing back 14 of dispenser 10, leaves a circular dispenser or canister suitable for reuse by the operator. The breakaway line 52 along which bracket 21 may be separated from canister 14 is illustrated at FIG. 2 and in fragmentary form in FIG. 3.

At FIG. 4 is shown a cross sectional view of the assembly taken along the line 4—4 of FIG. 1. Shown at FIG. 4 is a spindle 54 formed within the central portion of the underside of the housing front 12. This centrally located spindle 54 rotatably engages the hole in the hub 28 of spool 26 and rotatably supports spool 26. The spindle 54 is mounted on a central boss 56 formed on the inner surface of the cover 12. Also shown in FIG. 4 are the internal threads 40 formed within the lip ring 16 of cover 12. These internal threads 40 are shown in FIG. 4 engaged with the external threads 38 of the mouth ring 36 of canister 14. FIG. 4 also illustrates a cross sectional view of the rod shaft engaging hook 20 for attachment of the dispenser 10 to a fishing rod 58. In FIG. 4 the fishing line spool 26 with its wound line 24 mounted thereon is shown engaged with the resilient pad 34 within the dispenser 10.

FIG. 5 illustrates the fishing line dispenser 10 of this invention in its position of use mounted on a shaft of fishing rod 58. In FIG. 5 the fishing line 24 is being dispensed from the dispenser 10 through the fishing line feed aperture 22, not shown in this figure, onto the fishing reel 44.

Other modifications of the invention will be apparent to those skilled in the art in light of the foregoing description. This description is intended to provide specific examples of a preferred embodiment of the present invention. Accordingly, the invention is not limited to the embodiment shown or the use of elements having specific configurations and shapes as presented herein. Alternative modifications and variations of the present invention which follow in the spirit and broad scope of the appended claims are included.

What is claimed is:

1. A fishing line dispenser mountable on a fishing rod for dispensing fishing line onto a reel mounted on the fishing rod, the dispenser comprising:
   (a) a spool of fishing line having a free end for dispensing line onto said reel;
   (b) a housing rotatably supporting said spool with the free end of the line operatively connected to the reel;
   (c) means for releasably securing said housing to a shaft of said fishing rod while the line is transferred from the spool to the reel;
   (d) a resilient pad engaging a side wall of said spool and an inside surface of the housing for providing drag to said spool for maintaining tension in fishing line being wound from the spool to the reel; and
   (e) means for varying the drag on the spool by varying the spacing between the side wall of the spool and the inside surface of the housing engaged by the resilient pad to vary the friction between the pad and the surface of the housing.

2. The apparatus of claim 1, wherein said housing further comprises a closed container having a cover and a container portion with a fishing line feed aperture formed therein when the spool is enclosed in the closed container.

3. The apparatus of claim 2, wherein cover and container portion of said closed container are threadably engaged.

4. The apparatus of claim 2 wherein a fluid tight seal is formed between the cover and container portions thereby providing a fluid tight closed container.

5. The apparatus of claim 1, wherein said means for releasably securing said housing to said fishing rod further comprises a pair of rod hanger hooks projecting from said housing and the hooks are constructed and arranged for engaging the shaft of the fishing rod to position the spool of fishing line to dispense line onto the reel.

6. The apparatus of claim 5 wherein the rod hanger hooks are integrally formed in a hanger bracket which is constructed and arranged for mounting the fishing line dispenser on a display board.

7. The apparatus of claim 5 wherein the rod hanger hooks are integrally formed in a hanger bracket which is constructed and arranged to be broken away from the housing to permit use of the dispenser as a closed container after the line has been dispensed.

8. The fishing line dispenser according to claim 3 wherein the means for varying the drag on the spool are a threaded connection between the cover and container constituting the housing.

9. A fishing line dispenser mountable on a shaft of a fishing rod for dispensing fishing line onto a reel mounted thereon, comprising:
   (a) a spool of fishing line having a central hub, one end of the fishing line being operatively connected to a reel to be wound thereon;
   (b) a housing, attached to the rod shaft, and constructed and arranged for rotatably supporting said spool;
   (c) a resilient pad engaging a side wall of said spool and an inside surface of the housing for providing drag to said spool for maintaining tension in fishing line being wound from the spool to the reel;
   (d) means for varying the drag on the spool by varying spacing between the side wall of the spool and the inside surface of the housing engaged by the resilient pad to vary friction between the pad and the inside surface of the housing; and (e) means for releasably securing said housing to the shaft of said fishing rod to position and support the spool for delivery of line to the reel.

10. The apparatus of claim 9, wherein said housing generally encloses the spool and further comprises a two-piece closed container having a line feed aperture positioned when the housing is mounted on the rod shaft for delivering fishing line in a straight line from the spool to the reel.

11. The apparatus of claim 9, wherein said housing further includes spindle means for engaging the central hub and rotatably supporting said spool.

12. The apparatus of claim 9, wherein means for attaching said housing to said fishing rod are provided which further comprise a pair of shaft engaging hooks mounted on said housing.

13. The fishing line dispenser of claim 10 wherein the means for varying the drag on the spool are a threaded connection between a cover and container constituting the housing.

* * * * *